United States Patent [19]

Strudgeon et al.

[11] 4,237,002
[45] Dec. 2, 1980

[54] MULTI SORPTION PROCESS AND SYSTEM

[75] Inventors: George E. Strudgeon, Erie, Pa.;
Aloysius X. Hiltgen, Inverness, Fla.

[73] Assignee: Zurn Industries, Inc., Erie, Pa.

[21] Appl. No.: 6,421

[22] Filed: Jan. 24, 1979

[51] Int. Cl.³ .................................................. B01D 15/00
[52] U.S. Cl. ...................................... 210/631; 210/663; 210/669; 210/676; 210/189
[58] Field of Search .................. 210/18, 25, 27, 33, 210/40, 735, 96.1, 189, 202, 203, 259, 266, 269, 284, 295, 335

[56] References Cited

U.S. PATENT DOCUMENTS

| | | | |
|---|---|---|---|
| 3,337,450 | 8/1967 | Dubach | 210/16 |
| 3,551,203 | 12/1970 | Corson et al. | 127/46 |
| 3,763,040 | 10/1973 | Timpe et al. | 210/40 |
| 3,767,570 | 10/1973 | Clapp | 210/40 |
| 3,803,029 | 4/1974 | Blecharczyk | 210/16 |
| 3,855,123 | 12/1974 | Strudgeon et al. | 210/31 |
| 3,904,518 | 9/1975 | Hutton et al. | 210/11 |
| 3,980,556 | 9/1976 | Besik | 210/6 |
| 4,008,161 | 2/1977 | Wong et al. | 210/30 R |
| 4,025,426 | 5/1977 | Anderson et al. | 210/25 |
| 4,053,396 | 10/1977 | Trense et al. | 210/17 |
| 4,066,538 | 1/1978 | Cines et al. | 210/40 |
| 4,069,148 | 1/1978 | Hutton et al. | 210/11 |
| 4,157,961 | 6/1979 | Borst | 210/40 |

Primary Examiner—Ivars C. Cintins
Attorney, Agent, or Firm—Robert R. Hussey

[57] ABSTRACT

An improved process for treating a waste liquid containing impurities which inhibit the biological treatment of the liquid providing a first and a second sorbent treatment zone. The waste liquid is treated in the first sorbent treatment zone with a sorbent material which has previously been used to treat the liquid in the second zone. The waste liquid is passed through a biological treatment system and is subsequently received in the second sorbent treatment zone. The liquid is treated in the second zone with fresh activated sorbent material. After use of the sorbent material in the second sorbent treatment zone, the sorbent material in the second zone is transferred to the first sorbent treatment zone.

Systems for the practice of the above process are also disclosed.

7 Claims, 4 Drawing Figures

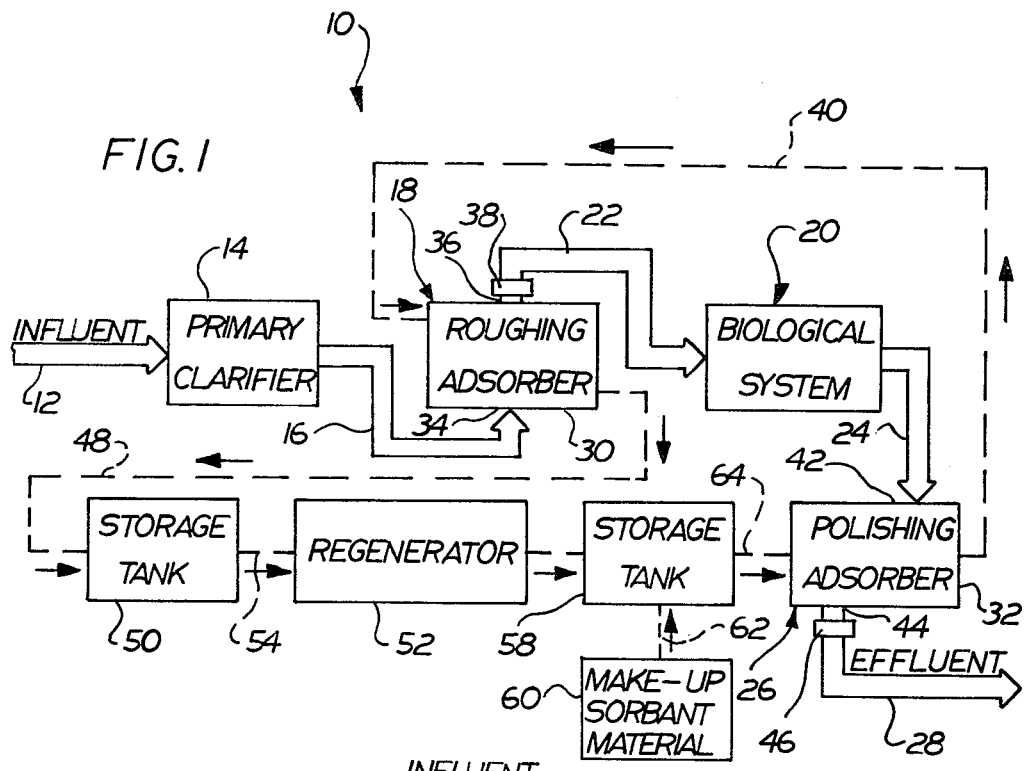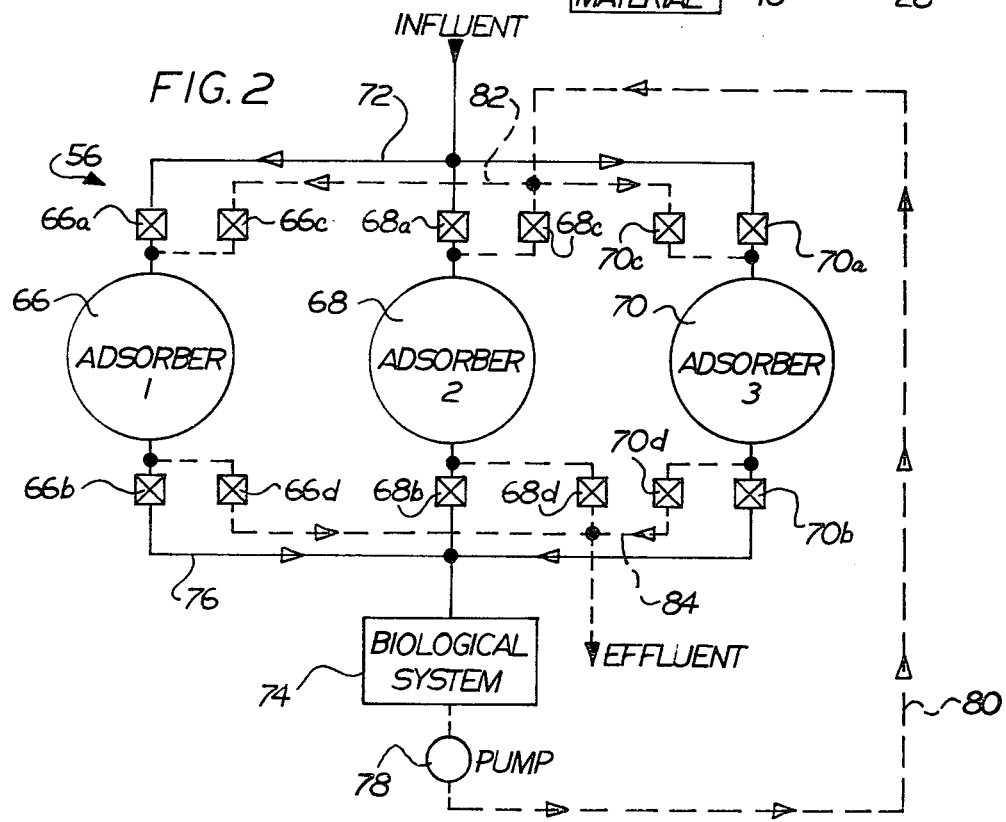

MULTI SORPTION PROCESS AND SYSTEM

BACKGROUND OF THE INVENTION

1. Field of the Invention

This invention relates to a process and system for purifying waste liquid. More specifically, the invention is directed to a multi sorption process and system for treating such waste liquid.

2. Description of the Invention

For a great many years, liquids such as water have been treated to remove municipal and industrial wastes which have been deposited in them. In recent years, with a greater emphasis being placed on environmental protection, municipalities and industrial concerns have had to place an increased emphasis on obtaining an effluent having a high degree of purity from liquid waste removal systems.

Liquid waste removal processes and systems are concerned with two basic types of operations, one being the removal of settleable, floating and suspended solids from liquids and the other being the removal of dissolved materials from liquids. Settleable, floating and suspended solids, such as clays, bits of organic waste, and oil droplets, are removed by use of sedimentation tanks, flotation tanks, flocculation systems and screening. Dissolved material, including organic and inorganic compounds, are removed by processes such as reverse osmosis, electrodialysis, ion exchange, foam separation, chemical precipitation, chemical oxidation or acid leeching, distillation and adsorption on activated carbon or alumina. Biological processes are used to remove bio-degradable organic materials whether in suspended or dissolved form.

One biological purification system, generally known as the activated sludge process, is normally conducted as a continuous operation. A preliminary mechanical purification is usually affected to remove coarse suspended solids from the influent liquids. The liquid then passes into an aerating tank for biological purification. In the aerating tank, the liquid to be purified is aerated in the presence of micro- and macro-organisms for brevity referred to as biological or activated sludge. Due to the activity of the bacteria, the organic impurities present in the liquid are assimilated and decomposed and consequently the bacteria rapidly multiply. The added bacteria are removed by means of the macro-organisms, notably the bacteriophagic protozoae since the bacteria otherwise could only be removed with difficulty due to their lack of sedimentability. The liquid under treatment is then fed to a secondary purification tank in which the sludge is sedimented and the liquid under treatment leaves the secondary purification tank as biologically purified liquid. A part of the activated sludge sedimented in the secondary purification tank is recirculated to the aerating tank for reseeding and maintaining the desired sludge concentration in the aerating tank. The other part of the sludge is withdrawn and constitutes the sludge surplus.

One specific biological treatment process is disclosed in Dubach, U.S. Pat. No. 3,337,450 which provides for a first stage for allowing the bacteria to develop to their full efficiency and precipitate and a second process stage in which the bacteriophagic organisms can develop in preference to the bacteria to remove the balance of the bacteria.

The concentration of organic waste material in a liquid such as water may be measured in terms of biochemical oxygen demand (BOD) and chemical oxygen demand (COD) or other convenient terms. Each of these terms measures the amount of waste material in a sample of water in terms of the quantity of oxygen required to react with the waste material under prescribed conditions. BOD is a measure of the oxygen required by bacteria to degrade and decompose the waste material under prescribed conditions in a five-day period of time. COD is a measure of the equivalent amount of oxygen required for a strong oxidizing agent to oxidize the waste material to carbon dioxide and water under prescribed conditions. Both BOD and COD are expressed in milligrams per liter (mg/l).

Generally, industrial waste water and, in some cases, municipal waste water, contain impurities which poison or are toxic to or otherwise generally inhibit the growth of bacterial forms employed in the bacteriological treatment of waste water, which materials may sometimes be hereinafter referred to as bio-inhibiting contaminants. These bio-inhibiting contaminants include such materials as the toxics, phenols, nitro-phenols, pesticides and herbicides. When present in sufficient quantities these bio-inhibiting contaminants inhibit or "poison" the biological purification process described above, thereby decreasing the efficiency of the biological system, even to the point of sometimes "killing" the biological life.

Although these bio-inhibiting contaminants may be non-biodegradable and thus not considered to deplete the oxygen content of the receiving waters, they may biodegrade over a period greater than five (5) days measured by the BOD test and thus deplete oxygen in larger rivers and lakes. Furthermore, these bio-inhibiting contaminants may be noxious since such contaminants affect the taste, odor and color of the receiving waters and exhibit toxic effects on the fish and plant life therein. Thus, even when the biological treatment plants are operating under optimum conditions, the amount of organic contaminants removed may not be sufficient to meet present standards. As a consequence, there is a need for further treating of the effluents from such biological secondary treatment plants, as well as a need for an improved process for treating industrial waste waters in order to remove both biodegradable and non-biodegradable organic contaminants therefrom.

The use of various sorption materials to purify waste liquids, has been recognized by the prior art. For ease of description and without intending to limit this invention, the background of the invention will be further developed with particular reference to the sorptive material of activated carbon. In an adsorption process, the adsorbent activated carbon in this instance, attracts molecules of dissolved materials to it because of the pore structure of the carbon. Each granule or particle of the activated carbon contains a vast inter-connected network of pores of various sizes providing a large surface area for adsorbing molecules and thus has a large adsorption capacity. The molecules of the dissolved materials are lodged in the pores. These molecules are retained in the pores until they are removed, for example by thermal regeneration of the activated carbon which uses heat to release the previously dissolved molecules from the carbon. The prior art, in U.S. Pat. No. 3,803,029, has also shown a method of biologically regenerating adsorbent material for reuse.

It should be clearly understood that activated carbon in either a granular or powdered form is relatively expensive even though our activated carbon may be regenerated. Reactivation of the carbon is an expensive process. Furthermore, additional fresh activated carbon must be added to make up for the carbon lost in the reactivation process.

The prior art, in U.S. Pat. No. 3,855,123, has disclosed a sorption process in which the waste liquid passes through beds of granular carbon. The prior art has also disclosed passing industrial waste water through a bed of granular carbon before biologically treating that waste water. The BOD and COD levels of the influent, the water flowing into the system, and the BOD and COD levels of the effluent, the water flowing out of the system, are continuously measured. The system is designed to keep the BOD and/or COD level of the effluent below a prescribed amount. When the level of the BOD or the COD of the effluent rises above this amount, a "breakthrough" is said to occur in the sorbent material, in this case the activated carbon, must be replaced. This point of "breakthrough" is dependent on the concentration of the adsorbate, or contaminants adsorbed by the activated carbon. Activated carbon is capable of adsorbing a predetermined amount of contaminants depending on the concentration of those contaminants in the liquid and accordingly becomes saturated and incapable of adsorbing any more contaminants.

The activated carbon adsorbs dissolved molecules of the contaminants from water until it becomes saturated by remaining in contact with the water for a prescribed residence time. This time depends on the rate of adsorption of the adsorbent, for example the activated carbon, and the adsorption isotherm of the activated carbon. The "adsorption isotherm" is the relationship between the adsorptive capacity and equilibrium capacity or saturation point of the activated carbon adsorbent at a given constant temperature. It is expressed as a function of both the amount of adsorbate or contaminants which are adsorbed per unit weight of activated carbon and the concentration of the adsorbate in the water. For additional information concerning adsorption isotherms see U.S. Environmental Protection Agency Process Design Manual for Carbon Adsorption, Number EPA 625/1-71-002A, October, 1973, pages 4-4 through 4-7. It should be clearly understood that in either the granular carbon systems or the powdered carbon systems that the activated carbon adsorbs the dissolved molecules of the contaminants until breakthrough, at which time the activated carbon is saturated with the molecules of the contaminants.

In granular carbon systems, the waste liquid is purified by percolating it through either one or a number of columns containing activated carbon adsorbent. Where more than one column is used, the columns themselves are connected in series and parallel or in a series-parallel combination and the liquid may flow through them in an upflow or downflow direction or a combination thereof as disclosed in U.S. Pat. No. 3,855,123, the disclosure of which is hereby incorporated by reference. The size of the column or columns used is such that the liquid to be purified remains in contact with adsorbent for the prescribed residence time.

In powdered carbon systems, the liquid to be purified by the activated carbon is combined in a contacting container for the prescribed residence time and the carbon is separated from the purified liquid with a continuous filter or sedimentation operation.

The prior art has recognized in U.S. Pat. Nos. 3,904,518, 3,980,556 and 4,069,148 various processes for exposing waste water to activated sludge and a sorption material. Another prior art process is disclosed in U.S. Pat. No. 4,053,396 which provides for dissolving oxygen in the waste water while the waste water is passed through at least one bed of activated carbon. Other prior art methods, such as that disclosed in U.S. Pat. No. 4,008,161, provide a method for purifying waste water by passing an oxygen-containing gas through the waste water while the waste water is in intimate contact with finely divided activated carbon. A clarification agent is then added to the treated waste water to chemically precipitate the undesirable materials and the sludge thus formed from the treated water.

These prior art processes, methods and systems have limited effectiveness since their efficiency in removing contaminants from the waste water is not maximized. Due to the high cost of sorption material and systems, it is highly desirable to maximize their effectiveness and efficiency. The process and system of the present invention efficiently reduces the biological oxygen demand, the chemical oxygen demand and the total organic content of the waste water to provide an effluent liquid of improved purity. This process is particularly adaptable for treating liquids containing impurities which inhibit the biological treatment of the liquid, in particular industrial waste water alone or with mixtures of industrial waste water and sewage or other waste water.

It has been found that the present invention provides a process and system for treating a liquid containing impurities which inhibit the biological treatment of the liquid having an improved performance over such processes and systems of the prior art. The process of the present invention includes the steps of:

a. providing at least a first sorbent treatment zone and a second sorbent treatment zone;

b. treating the liquid in the first sorbent treatment zone with a sorbent material which has been previously used to treat the liquid in the second sorbent treatment zone;

c. passing the liquid through a biological treatment system;

d. treating the liquid received from said biological treatment system in the second sorbent treatment zone with a fresh activated sorbent material; and e. transferring sorbent material from the second zone to the first zone after using the sorbent material in the second zone.

According to the adsorption isotherm, the amount of impurity or organic chemical adsorbed on the activated carbon is proportional to the concentration of the impurity in the solution. Thus, when the activated carbon is exposed to higher concentrations of impurities, the activated carbon will adsorb a greater amount of impurities.

For ease of description of the present invention, the term "fresh sorbent material" or "freshly activated sorbent material" or the like will include activated sorbent material, such as carbon, used in any process and activated sorbent material, such as carbon, which has previously been used and thereafter is regenerated or reactivated so that its sorptive capacity is substantially the same as the sorptive capacity of new or unused activated sorbent material.

By treating the liquid in the second sorbent treatment zone with "fresh" activated sorbent material, that is, sorbent material after activation or reactivation thereof and before use in the process to treat the liquid, the activated carbon will be exposed to waste water with relatively low concentrations of impurities. Consequently, the amount of the impurities actually adsorbed by the carbon is relatively small. Since the activated carbon is "fresh" the amount of impurities adsorbed thereby will be maximized and the effluent will be further purified.

Upon breakthrough of the sorbent material in the second sorbent treatment zone, the sorbent material is transferred to the first sorbent treatment zone. The first zone is used to treat the liquid having a higher concentration of impurities than the liquid treated by the second zone. The first zone is provided to move the impurities which inhibit the biological treatment of the liquid and may perform that function either before or during the biological treatment of the liquid. Since the sorbent material in the first zone is exposed to a liquid having a much higher impurity concentration than the liquid in the second zone, the sorbent material is able to adsorb a greater amount of impurities upon transfer from the second zone to the first zone. By removing biologically inhibitory contaminants in the first zone, the efficiency of the biological treatment and purity of the liquid treated thereby is substantially improved. This treatment of the liquid in the first zone is generally referred to as a "roughing" treatment. The system of the present invention also provides a "polishing" treatment of the liquid for removing impurities in the second zone which improves the effectiveness of the sorbent material. The process of this invention may be used to reduce the size of the treatment zones needed to treat a selected volume of waste water, thus lowering the initial plant costs. It increases the efficiency of the biological treatment over that of present biological treatment processes for a particular volume of waste water by lowering the treatment time and allowing higher flow rates. This invention also provides a process which removes colored impurities and bio-inhibiting contaminants while optimizing the effectiveness and efficiency of sorbent material. In addition to removing biologically inhibiting contaminants, the adsorbent also removes odors and other contaminants which cause foam from the waste water.

BRIEF DESCRIPTION OF THE DRAWINGS

FIG. 1 is a schematic representation of the steps involved in one form of a process and system for treating a liquid of the present invention;

FIG. 2 is a schematic representation of a system for changing the adsorbers used in a liquid treating process and system of the present invention;

DETAILED DESCRIPTION OF THE INVENTION

Figure 3:
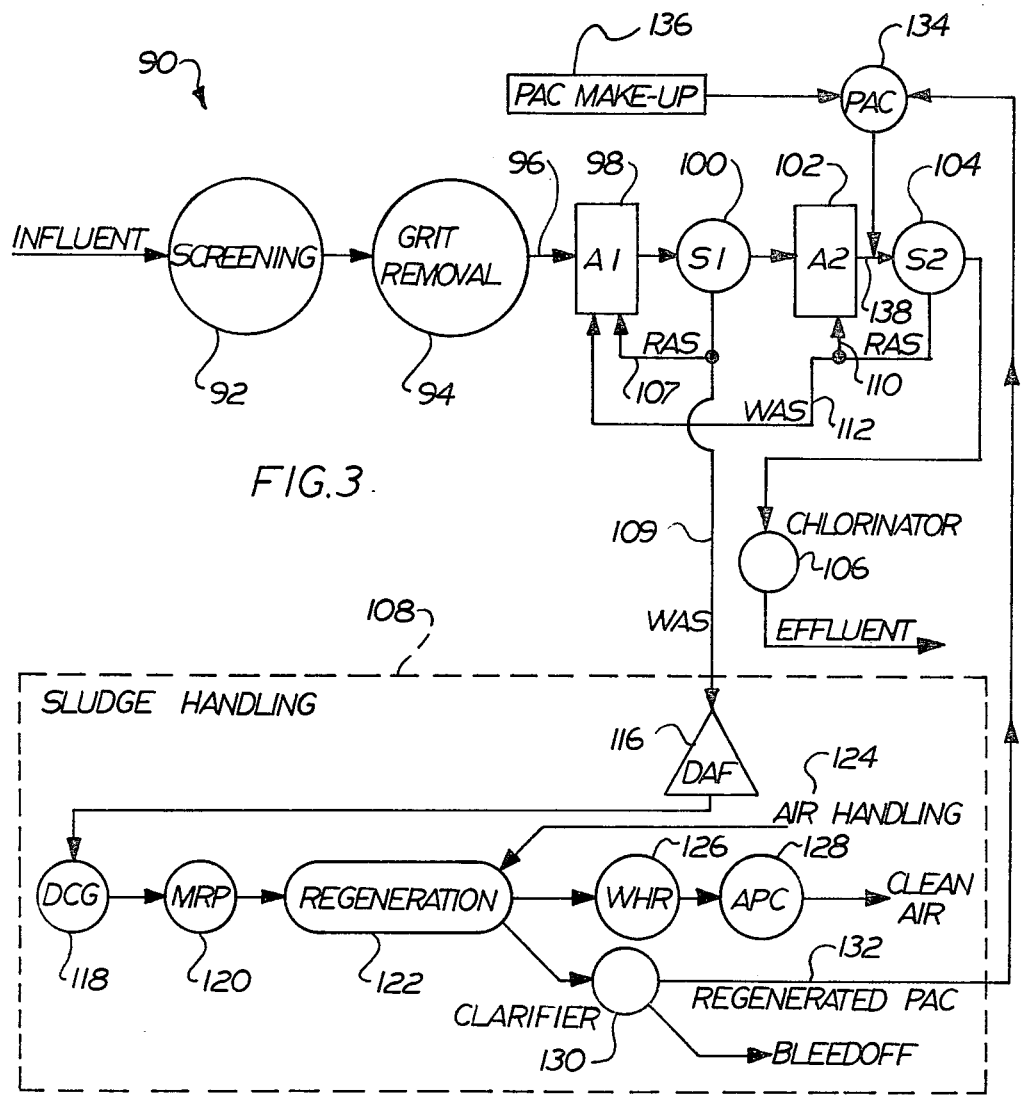
FIG. 3 is a schematic representation of the steps involved in another form of the liquid treating process and system described herein.

The present invention provides a new and improved system and process for treating a waste liquid containing impurities which inhibit the biological treatment of the liquid and provides for a first and second sorbent treatment zone. The waste liquid is treated in the first sorbent treatment zone with a sorbent material which has previously been used to treat the liquid in the second zone. The waste liquid is passed through a biological treatment system and is subsequently received in the second sorbent treatment zone. The liquid is then treated in the second zone with fresh activated sorbent material. Upon breakthrough of the sorbent material in the second sorbent treatment zone with respect to the liquid treated thereby, the sorbent material in the second zone is transferred to the first sorbent treatment zone.

It should be understood that throughout the description of the embodiments described herein, the "roughing" step or process or any other preceding sorbent treatment zone is the first sorbent treatment zone and the "polishing" step or process or any subsequent sorbent treatment zone is the second sorbent treatment zone. From the above, it can be seen that one sorbent treatment zone may be a polishing zone with respect to a preceding sorbent treatment zone and a roughing zone with respect to a subsequent treatment zone.

The sorbent material used may comprise any of a number of sorbent materials including granular or powdered solid sorbents which are used to remove dissolved materials from liquids. The type of sorbent used depends on the sorption process which is required and these processes include acid leeching, sorbent extraction, ion exchange and adsorption using activated carbon, activated alumina or other adsorbents. To facilitate the discussion of this invention, it will be described with respect to its use in connection with activated carbon, both granular and powdered, used as the sorbent material and is not intended to limit the scope of this invention.

Referring now, more specifically, to the drawings and in particular to FIG. 1, a process and system 10 of this invention is shown. The system 10 operates to treat a liquid containing impurities which inhibit the biological treatment of the liquid as described above. The liquid, before treatment by the system 10, is referred to as influent liquid and the liquid after treatment by the system 10 is referred to as the effluent liquid. The influent has certain pollutants therein, both suspended and dissolved, including impurities which inhibit the biological treatment of the liquid. Means, generally indicated at 12, is provided for supplying the influent to a means for removing suspended solids such as a primary clarifier 14. The primary clarifier 14 is provided to remove the suspended solids from the influent and may be of any design known to those skilled in the art which removes suspended solids from the influent.

The liquid under treatment is then transported by means 16 to the first sorbent treatment zone, generally indicated at 18, where the liquid is treated with sorbent material as hereinafter described. The liquid is then transferred from the first sorbent treatment zone 18 to the biological system 20 by transporting means 22. The liquid is biologically treated in the biological system 20 and is subsequently transported by means 24 to the second sorbent treatment zone 26. In the second sorbent treatment zone 26, the liquid is treated by a sorbent material as will be hereinafter more fully described. The effluent liquid so treated is then conducted from the system 10 by means 28. It is within the contemplation of this invention that other additional liquid treating processes may be used in conjunction with this invention to further purify the liquid passing through the system 10.

To facilitate the description of the present invention, the term "fresh sorbent material" or "freshly activated material" or the like will include activated sorbent material, such as carbon, which has not previously been used in any process and activated sorbent material, such as carbon, which has previously been used and after that use has been reactivated or regenerated by any means known to those skilled in the art, such as a multiple hearth furnace or a rotary kiln so that its sorptive capacity is substantially the same as the sorptive capacity of new or unused activated sorbent material.

The activated carbon flows through the system 10 in a manner which maximizes its effectiveness and efficiency as herein described. The first and second treatment zones, 18 and 20, provide a first column or roughing adsorber 30 and a second column or polishing adsorber 32, respectively. The adsorbers 30 and 32 each contain a bed of sorptive material, such as granular activated carbon. In order to maximize the effectiveness and efficiency of the sorption material, the polishing adsorber 32 is supplied with "fresh" sorbent material. Upon breakthrough of the sorbent material in the polishing adsorber 32, that sorbent material is transferred to the roughing adsorber 30 as will be hereinafter more fully described.

The liquid flowing into the roughing adsorber 30 is received at the lower end 34 of the roughing adsorber. The liquid then percolates upwardly through the bed of activated carbon in the roughing adsorber 30, so that the bed of carbon sorbent is partially expanded by the upward flow of the liquid mixing the sorbent within the bed. In such an upflow system, suspended particles which tend to accumulate or grow within downflow columns can be tolerated and greater service times between backwashes are achieved. In addition, the liquid is efficiently contacted by the sorptive material.

The liquid so treated flows out of the roughing adsorber 30 through the upper end 36 thereof and is transported by means 22 to the biological system 20. As has been previously described, when the level of the BOD or COD of the liquid treated rises above a predetermined amount, a "breakthrough" occurs and the sorbent material is then incapable of effectively removing additional impurities from the liquid unless it is exposed to a liquid having a higher concentration of impurities. Accordingly, means, schematically indicated at 38, is provided for detecting breakthrough of the sorbent material and may be of any design well known to those skilled in the art. When a breakthrough occurs, the sorbent material in the roughing adsorber 30 is replaced with the sorbent material in the polishing adsorber 32 by the transferring means generally indicated in dash lines at 40.

The liquid treated by the biological system 20 is transported to the upper end 42 of the polishing adsorber 32 by the transporting means 24. The polishing adsorber 32 is provided with fresh activated carbon as will be hereinafter described. The liquid flows through the polishing adsorber 32 in a downflow direction. The fresh activated carbon serves to further treat the liquid to adsorb impurities therefrom and also acts as a filter which prevents fine suspended particles from flowing from the polishing adsorber 32 to thereby pass a clean effluent liquid. It should be understood that a schmutzdecke, a layer of fine particles of suspended solids and carbon, tends to develop on the upper surface of the bed in a downflow column causing a pressure head loss to develop. Consequently, it may be necessary to backwash such a downflow column to remove the schmutzdecke.

The liquid passing through the polishing adsorber 32 passes from the polishing adsorber 32 through the lower end 44 thereof and is conducted from the system 10 by means 28. Means 46 are provided for detecting breakthrough of the sorbent material in the polishing adsorber 32 and upon breakthrough that sorbent material is transported by means 40 to the roughing adsorber 30. Fresh activated carbon is supplied to the polishing adsorber 32 as will be hereinafter described. In the preferred embodiment of this invention, the means 38 and 46 for detecting breakthrough of the sorptive material in the roughing and polishing adsorbers 30 and 32 respectively, are connected so that upon breakthrough of the carbon in either one of the adsorbers occurs, the carbon is cycled as described above between the roughing adsorber, regenerator and polishing adsorber.

The spent carbon in the roughing adsorber 30 is removed from the roughing adsorber 30 and transported by means 48 to a storage tank 50. The regenerator 52 receives the spent carbon from the storage tank 50 through means 54. The regenerator 52 may be any type of regenerator which reactivates the sorbent material well known to those skilled in the art, such as a multiple hearth furnace, rotary kiln, or electric furnace or a chemical treatment and operates to remove the molecules of dissolved materials lodged in the pores of carbon. The carbon so reactivated has a sorptive capacity that is substantially the same as the sorptive capacity of new or unused sorbent material.

It should be understood that it is within the contemplation of this invention that other methods of regenerating the sorbent material may be used. In ion exchange systems, one such alternate regenerating method, a bed of material may be regenerated in situ within the column by passing a regenerating solution through the bed. While that column is being regenerated, another column may be substituted therefor as will be further described in connection with the system 56 described in FIG. 2. The system 56 may also be used in conjunction with the system 10 described in FIG. 1 so that one adsorber is in a regenerative cycle when not in use, as will be hereinafter more fully described, by passing the sorbent material through a regenerator or regenerating it in place.

The reactivated sorbent material regenerated by the regenerator 52 flows into a second storage tank 58. Since in most cases an amount of the sorbent material is lost in the regenerating or reactivating process, additional sorbent material must necessarily be provided to the second storage tank 58 from a makeup sorbent material source 60 through means 62.

When the sorbent material is transported from the polishing adsorber 32 to the roughing adsorber 30, fresh activated sorbent material is provided from the second storage tank 58 by means 64 to the polishing adsorber 32. As can be seen from the above, this fresh activated sorbent material includes reactivated carbon which has previously been used in the system 10 and new activated carbon which is used to "make up" for the carbon lost in the regenerating process. This fresh activated sorbent material has substantially the same sorptive capacity as the sorptive capacity of new or unused sorbate. Consequently, the fresh material is capable of effectively polishing the liquid treated in the polishing adsorber 32.

As can be seen from the above, the system 10 provides for maximizing the effectiveness and efficiency of the sorbent material used therein. As previously stated, the amount of impurity adsorbed by activated carbon is proportional to the concentration of that impurity in the solution as defined by adsorption isotherm. Accordingly, the higher the concentration of the impurity the carbon is exposed to, the greater amount will be adsorbed.

Since the liquid to be treated by the polishing adsorber 32 has previously been treated by both the roughing adsorber 30 and the biological system 20, many of the impurities contained in the influent liquid have been removed and the liquid treated by the polishing adsorber has been substantially purified. By using fresh activated carbon in the polishing adsorber 32, the carbon is capable of adsorbing impurities still remaining in the liquid and since the amount of impurities in the liquid are low, the amount of impurities adsorbed by the carbon are relatively small. Accordingly, the polishing adsorber 32 acts to "polish" and further refine the liquid passing through the system 10 prior to its discharge as effluent. By so polishing the effluent, additional bio-inhibiting contaminants are removed from the effluent which may deplete oxygen in the effluent receiving waters, such as rivers and lakes, and create certain noxious problems. If not removed, such contaminants also affect the taste, odor and color of the receiving waters allowing trace organics to escape and exhibit toxic effects on fish and plant life therein.

Even after breakthrough of the activated carbon used in the polishing adsorber 32, the activated carbon is still effective to remove impurities which inhibit the biological treatment of the liquid when exposed to liquids having a higher concentration of such impurities and contaminants. Accordingly, when breakthrough occurs in the polishing adsorber 32 and the activated carbon contained therein is transported to the roughing adsorber 30, the activated carbon still has substantial sorptive capacity. This capacity is due to the fact that the liquid treated by the roughing adsorber 30 has a higher degree of concentration of the impurities and contaminants which inhibit the biological treatment of the liquid. By removing these impurities and contaminants before the biological system 20, the efficiency of the biological system is improved.

It should be understood that it is within the contemplation of this invention to use any known sorption system as either the polishing or roughing adsorber 32, 30 respectively, such as pulse bed adsorbers which continuously change the sorbent material contained therein. Pulse bed adsorbers remove the used carbon from the bed and supply the bed with other carbon in a "pulsing" operation known to those skilled in the art. It is also within the contemplation of this invention to use a number of different adsorbers or columns and successively transfer the sorptive material to the upstream adsorbers so as to maximize the effectiveness and efficiency of the sorbent material.

Manifolding systems such as the system 56 described in FIG. 2 may also be used if it is desirable for the adsorber being regenerated to be out of use during the regeneration process or when using an ion exchange process for regenerating the carbon.

The system 56 in FIG. 2 provides for the use of three adsorbers one of which is used as a roughing adsorber, the second of which is used as a polishing adsorber while the sorbent material in the third adsorber is regenerated or replaced with fresh sorbent material. The system 56 includes the adsorbers 66, 68 and 70 which may be of any design well known to those skilled in the art including those described above in connection with the roughing adsorber 30 and polishing adsorber 32. The adsorbers 66, 68 and 70 may be connected to the influent manifold, schematically indicated at 72, by means of influent inlet valves 66a, 68a and 70a, respectively. The influent liquid passes through and is treated by one or more of the adsorbers 66, 68 and 70 when its respective influent inlet valve 66a, 68a and 70a is open. The liquid then flows from the adsorber through its respective influent outlet valve 66b, 68b and 70b to the biological system 74 by the manifolding means, schematically indicated at 76.

The particular adsorber through which the influent liquid so flows performs a function described above in connection with the roughing adsorber 30 to remove impurities from the influent which inhibit the biological treatment of the liquid.

After treatment of the liquid in the biological system 74, a pump 78 pumps the liquid so treated through the transporting means 80 to a manifold system, schematically indicated at 82. Manifold system 82 inter-connects the polishing inlet valves 66c, 68c and 70c. One of the polishing inlet valves 66c, 68c and 70c is in an open position and the liquid passes through one of the adsorbers 66, 68 and 70 which is not in use as the roughing adsorber. After treatment of the liquid in the polishing adsorber, the liquid so treated passes through the polishing outlet valve 66d, 68d and 70d associated with the particular adsorber used as the polishing adsorber to the effluent manifolding system, schematically indicated at 84, and thence from the system 56 as effluent. The other adsorber which is not in use as either the roughing or polishing adsorber is accordingly rendered inoperative and during this inoperative period, the sorbent material contained therein may be replenished with fresh sorbent material or reactivated in situ.

To illustrate the operation of the system 56 shown in FIG. 2, assume that the roughing adsorber is adsorber 66, the polishing adsorber is adsorber 68, and the adsorber 70 is in the process of having the sorptive material contained therein reactivated or regenerated. The influent flows through the manifold 72 and influent inlet valve 66a, where it is treated by the roughing adsorber 66. The influent then flows from the roughing adsorber 66 through the influent outlet valve 66b and the manifolding 76 to the biological system 74. The valves 68a, 68b and 70a and 70b are in their closed positions so that the influent liquid treated by the roughing adsorber 66 cannot pass into or through the adsorbers 68 and 70.

The liquid is then treated in the biological system 74 which includes any biological system known to those skilled in the art. After treatment in the biological system 74, the liquid is transported through the transporting means 80, such as piping, by the pump 78. The liquid so transported flows through the manifold 82 and the valve 68c, which is in an open position, so that it is then treated in the polishing adsorber 68. It should be understood that the polishing inlet valves 68c and 70c are in the closed position so that the liquid treated by the biological system cannot flow through the adsorbers 66 and 70.

Upon treatment of the liquid in the polishing adsorber 68, the liquid flows through the polishing outlet valve 68d through the manifolding system 84 and an effectively treated effluent is received therefrom. It should be understood that the polishing outlet valves 66d and 70d are closed so that the effluent cannot backflow into the adsorbers 66 and 70.

During the above-described process, no liquid to be treated is passed through the adsorber 70 since the valves 70a, 70b, 70c and 70d are all in their closed positions. During this period in time, the sorptive material in the adsorber 70 may be regenerated or replaced with fresh sorbent material. For example, this sorbent material may be transported from the adsorber 70 to any regenerator well known to those in the art or chemically regenerated in situ as described above by techniques known to those skilled in the art.

When a breakthrough occurs at either the roughing adsorber 66 or the polishing adsorber 68, the adsorber 70 is connected into the system 56 as the polishing adsorber while the spent sorbent material in the adsorber 66 is regenerated or replaced with fresh sorbent material. The adsorber 68 previously used as a polishing adsorber is now connected in the system 56 to act as the roughing adsorber. These connections are effected by opening valves 68a, 68b, 70c and 70d and closing the remainder of the valves, namely 66a, 66b, 66c, 66d, 68c, 68d, 70a and 70b. It should be understood that any one of the adsorbers 66, 68 and 70 may be the roughing adsorber or the polishing adsorber or the inoperative adsorber depending on the position of the valves connected thereto.

By using the adsorber 68 first as a polishing adsorber and subsequently as a roughing adsorber, the effectiveness and efficiency of the sorbent material contained therein and the operation of the biological system 74 is substantially improved as described above in connection with the sorbent material used in the system 10.

Another liquid treating process and system 90 of the present invention is schematically represented in FIG. 3. To facilitate the discussion of this invention, it will be described with respect to its use in connection with powdered activated carbon used as the sorbent material and, as stated above, is not intended to limit the scope of this invention. The influent liquid is first treated to remove suspended solids by the screening means 92 and the grit removal means 94. The screening means and grit removal means, 92 and 94 respectively, may be of any design known to those skilled in the art and it should be understood that other clarifiers, settling tanks and other means for removing suspended solids may be substituted therefor.

The liquid so treated is then transported by means 96 to a first aeration tank. After treatment in the first aeration tank 98, the liquid is transferred to the first clarifier indicated at 100. After treatment in the first clarifier 100, the liquid is transferred to and treated in the second aeration tank 102 and then transferred to the second clarifier 104 for treatment therein as described hereinbelow. The liquid is then transferred to a chlorinator 106 and is discharged from the system as a purified liquid effluent.

The system 90 provides a two-stage biological treatment in which the powdered activated carbon is used to remove impurities and thereby improve the performance and effectiveness of both stages. The first stage functions as a "roughing" stage at high BOD loadings and relatively short detention periods and includes the aeration tank (A1) 98 and clarifier (S1) 100. The second stage operates as a "polishing" stage to further refine the liquid treated thereby as hereinafter described and includes the aeration tank 102 and clarifier 104.

When the liquid is transported by means 96 into the first aeration tank 98, the environment of the liquid is controlled so that the bacteria but not the bacteriophagic organisms can fully develop. This is affected by controlling the aerating time, the oxygen or the amount of air in the liquid and the sludge concentrations in the liquid. The oxygen level is held at a low level to allow development of the bacteria. After a predetermined residence time in the first aerating tank 98, the liquid under treatment is transferred to the first clarifier 100 and sludge is removed by precipitation from the liquid. The clarifier or sedimenting tank 100 removes the sludge from the liquid to be treated, in any manner well known to those skilled in the art. A portion of the sludge is returned as return activated sludge (RAS) to the first aeration tank 98 as designated by the line 107 and the balance of the sludge is waste activated sludge (WAS) and is transported to a sludge handling system by the means, schematically designated by the line 109.

The effluent flowing from the first clarifier 100 predominantly contains that part of the bacteria which cannot be sedimented and is fed into the aerating tank 102 of the second stage where the conditions described above are controlled so that the bacteriophagic organisms find optimum conditions and develop freely. Since the effluent flowing from the first clarifier does not contain any substantial amount of free oxygen, additional oxygen is dissolved in the effluent to support the bacteriophagic organisms.

After the necessary residence time, the liquid is transferred to the second clarifier 104 in which the sludge is separated from the liquid. A portion of the sludge removed by the second clarifier 104 is returned as return activated sludge (RAS) to the second aeration tank 102 by the means schematically indicated by the line 110. The balance of the sludge from the second clarifier 104 is returned to the first aeration tank 98 by means 112 as waste activated sludge (WAS). It should be understood that the amount of the sludge deposited in the first and second aeration tanks 98 and 102 respectively, is such that the biological purifying function described above is properly maintained. As noted above, any excess waste sludge from the first clarifier 100 is conducted by the means 109 to a sludge handling system 108.

The sludge handling system 108 first treats the waste activated sludge with a dissolved air flotation system (DAF) 116. The sludge is then treated in a dual cell gravity thickener (DCG) 118, and then in a multiple roll press (MRP) 120.

The sludge so treated is regenerated by means 122 which may be of any design known to those skilled in the art and may be any regenerating means described hereinabove in connection with the system 10. When a thermal regeneration system, such as a multiple hearth furnace, electric furnace, rotary kiln or the like, is used as the regeneration system 122, an air handling system 124 is provided to supply air to the regenerator 122. The atmosphere in a regeneration furnace is closely controlled and no free $O_2$ is allowed or burning will start. The combustion gas from the regenerator 122 is passed through a waste heat recovery device 126 where certain amounts of heat are recovered from the combustion gas. Subsequently, the exhaust gases are passed through an air pollution control device 128 to clean the combustion gases so that clean air is returned to the atmosphere. The powdered activated carbon reactivated by the regenerator 122 is passed into a clarifier 130 where any residuals are bled off and the regenerated powdered activated carbon is transmitted by means 132 to the powdered activated carbon source (PAC) 134. The DAF 116, DCG 118, MRP 120, devices 126, 128 and clarifier in the sludge handling system may be of any design known to those skilled in the art. In addition, any sludge handling system known to those skilled in the art may be used.

The powdered activated carbon is utilized in the system 90 to remove contaminants which inhibit the biological system as herein described while maximizing the efficiency and effectiveness of that sorbent material. The powdered activated carbon source 134 provides a source of fresh powdered activated carbon including both regenerated powdered activated carbon and new activated powdered carbon. The new activated powdered carbon is supplied from the powdered activated carbon make up source 136. Additional new powdered activated carbon is necessary since some amounts of powdered activated carbon are lost in the regenerating process.

The powdered activated carbon initially contacts the liquid with the least amount of contaminants therein, that is, the liquid treated in the second clarifier 104. The powdered activated carbon is introduced in the form of a slurry into the liquid as it flows through the conduit 138 interconnecting the secondary aeration tank 102 with the second clarifier 104. In this manner, the powdered activated carbon is mixed with the liquid in the clarifier 104. As a result, the powdered activated carbon contacts the impurities in the liquid so that those impurities are adsorbed by the powdered activated carbon as described hereinabove.

The second clarifier 104 may be of any construction known to those skilled in the art. One such clarifier is a carbon contactor which includes a chamber having means for maintaining the powdered activated carbon in mixture with the liquid to be treated, such as a rotating paddle. The carbon contactor also includes means for separating the treated liquid from the sludge and conducting the treated liquid therefrom to the chlorinator 106. The carbon contactor also includes means for drawing off the sludge from the contactor.

Once the powdered activated carbon adsorbs a certain amount of impurities, it settles out or is drawn off as sludge along with the biological sludge. A portion of that sludge is transferred to the second aeration tank 102 as return activated sludge through conduit 110 and the balance of the sludge is returned to the first aeration tank 98 through conduit 112 as waste activated sludge (WAS).

In each case, the activated carbon again will come into contact with impurities at a higher concentration level than the impurities of the liquid in the second clarifier 104. Accordingly, the activated carbon is capable of removing additional impurities from the liquid as further described above. The returned activated sludge so deposited in the second aeration tank 102 removes the impurities which inhibit the biological reaction occurring in the second aeration tank and thereby improve the efficiency thereof. The balance of the sludge introduced by means 112 into the first aeration tank 98 is placed into contact with an even higher concentration of impurities and accordingly the carbon in that sludge is capable of removing yet greater amounts of impurities from the liquid treated thereby. Accordingly, these impurities which inhibit the biological treatment of the liquid are adsorbed in the activated carbon and the biological treatment of the liquid in both the first and second stages of the biological system is improved.

As described above, certain amounts of the sludge in the first aeration tank 98 pass into the first clarifier 100 which is of a construction similar to the clarifier 104. The clarifier 100 provides for removal of the sludge received or developed therein. In order to maintain a proper sludge balance in the first aeration tank 98, in some cases it is necessary to return some of the activated sludge as return activated sludge (RAS) through the means 107 to the first aeration tank 98. This sludge of course may have some carbon which has not completely adsorbed all of the impurities possible and by returning that sludge to the first aeration tank 98 it is again put in contact with the liquid having the highest amount of impurities.

The balance of the sludge is returned as waste activated sludge (WAS) to the sludge handling system 108 through the means 109 where the powdered activated carbon can be recovered by treatment thereof as described hereinabove. It should be understood that in the system described hereinabove, powdered activated carbon is successively placed into contact with liquid having successively higher concentrations of impurities which inhibit the biological treatment of the liquid.

Since the amount of impurities the carbon can adsorb increases as the concentration of the impurities in the liquid increases, the effectiveness and efficiency of the carbon is maximized. The carbon is also used to remove impurities which inhibit the biological treatment of the liquid, either before or in the preliminary stages of that biological treatment, and accordingly the effectiveness and efficiency of the biological system is substantially improved.

It should be clearly understood that additional stages of aeration tanks and clarifiers may be added to the system 90 to provide for additional biological treatment of the liquid. When such additional stages are added, the sludge received from the first clarifier 100 may be recycled as waste activated sludge to the next preceding aeration tank. The sludge received from its complimentary clarifier may be recycled both to its upstream aeration tank as return activated sludge (RAS) and the next preceding aeration tank as waste activated sludge (WAS). Accordingly, the sludge may be recycled to and through previous stages so that use of the powdered activated carbon contained therein is fully maximized.

Figure 4:
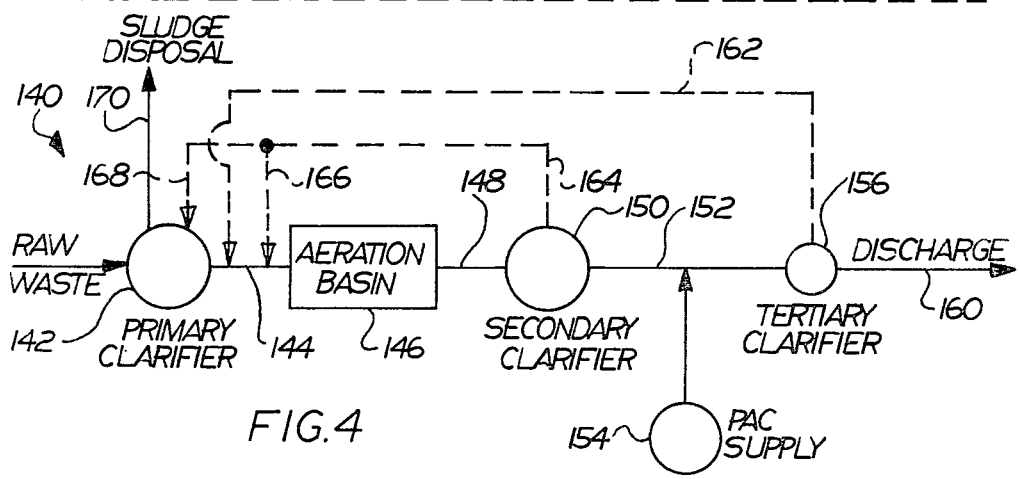
FIG. 4 is a schematic representation of the steps involved in yet another form of liquid treating process and system as described herein.

Another process and system 140 for treating a liquid containing impurities which inhibit the biological treatment of the liquid is disclosed in FIG. 4. The system 140 includes a primary clarifier 142 into which the raw influent waste liquid is conducted. The liquid treated in the primary clarifier 142 flows through the conduit 144 to an aeration basin 146 for biological treatment therein as well known to those skilled in the art. The liquid so treated moves through conduit 148 to a second clarifier 150 in which the sludge is removed from the liquid.

The liquid thus treated moves through conduit 152 where a powdered activated carbon supply 154 provides powdered activated carbon in a slurry and introduces it into the liquid passing through conduit 152. The mixture moves into the tertiary clarifier 156 where the powdered activated carbon removes impurities remaining in the liquid treated therein. It is to be understood that the tertiary clarifier 156 provides the final treatment of the liquid passing through the system 140 and flows through conduit 160 to discharge. The concentration of the impurities contained in the liquid flowing through conduit 160 is lower than in the previous treatment stages. A final step of filtration may follow to improve the suspended solids removal and catch the fine powdered carbon which may escape the clarifier 156. The powdered activated carbon is taken from the tertiary clarifier 156 in the form of sludge by means, schematically indicated at 162, and is introduced into the liquid passing through the conduit 144 before the liquid is treated in the aeration basin 146. The powdered activated carbon in the aeration tank 146 is then in contact with impurities of a higher concentration than the level of concentration of impurities in the tertiary clarifier 156 and adsorbs impurities which inhibit the biological treatment of the liquid in the aeration basin. This sorption process improves the biological process taking place in the aeration basin and increases the effectiveness and efficiency of the powdered activated carbon as herein described. Sludge, including biological sludge and powdered activated carbon, is removed from the second clarifier. It can be seen that the operation of the powdered activated carbon in the tertiary clarifier 156 operates as a polishing step while the operation of the carbon in the aeration basin 146 and second clarifier 150 operates as a roughing step.

The sludge collected from the second clarifier 150 is received by the conduit 164 and a portion of that sludge, return activated sludge, is introduced into the liquid passing into the aeration basin 146 through the conduit schematically indicated at 166. This return activated sludge provides for maintaining the proper balance of sludge in the system to maximize the biological treatment. The balance of the sludge received from the second clarifier 150, otherwise known as waste activated sludge, includes powdered activated carbon which is capable of adsorbing impurities which inhibit the biological treatment of liquid when exposed to liquid having higher concentrations of those impurities. This waste activated sludge is transmitted through the conduit, schematically indicated at 168, to the primary clarifier 142 for treatment of the raw waste influent. The raw waste influent does have a higher degree of impurities than the liquids to which the powdered activated carbon has previously been exposed. Accordingly, the powdered activated carbon in the sludge is capable of adsorbing additional impurities before settling out as sludge. The sludge which settles out of the primary clarifier 142 is conducted therefrom through conduit 170 as waste and is disposed of. It should be understood that a sludge handling system, such as system 108, may be provided to treat the sludge passing through conduit 170.

As can be seen from the above, the present invention provides a process for treating a liquid containing impurities which inhibit the biological treatment of the liquid by use of a sorbent material. The fresh sorbent material is contacted by the liquid after biological treatment thereof to further refine and polish the liquid. Since sorbent material is capable of adsorbing a greater amount of impurities when the concentration of the impurities increases, after the sorption material polishes the liquid treated by the biological system, it is capable of removing additional impurities which inhibit that biological treatment. The present invention provides for a "roughing" adsorption of impurities in the liquid to be treated in the biological system either before or during the biological treatment so that the efficiency of the biological system is increased and the efficiency of the sorptive material is maximized. Regeneration of the carbon after use in the process is also provided.

What is claimed is:

1. A process for treating a liquid containing impurities which inhibit the biological treatment of the liquid, said process comprising the steps of:

a. providing at least a first sorbent treatment zone and a second sorbent treatment zone in which the first sorbent treatment zone includes a first column containing a bed of granular solid activated carbon and the second sorbent treatment zone includes a second column containing a bed of granular solid activated carbon;

b. treating the liquid in the first sorbent treatment zone with granular activated carbon which has been previously used to treat the liquid in the second sorbent treatment zone by passing the liquid upwardly through the bed of activated carbon contained in the first column;

c. treating the liquid in a biological treatment system;

d. treating the liquid received from said biological treatment system in the second sorbent treatment zone with fresh granular activated carbon by passing the liquid downwardly through the bed of activated carbon contained in the second column;

e. removing the granular activated carbon from the first zone;

f. reactivating the granular activated carbon removed from the first zone; and g. transferring the granular activated carbon from the second sorbent treatment zone to the first sorbent treatment zone after using the granular activated carbon in the second sorbent treatment zone and upon a breakthrough of the granular activated carbon in one of the sorbent treatment zones.

2. The process of claim 1 which includes the step of: adding granular activated carbon to the second sorbent treatment zone.

3. The process of claim 1 in which the step of providing at least a first and second sorbent treatment zone includes providing a third sorbent treatment zone which includes a third column having fresh granular activated carbon therein and wherein the step of transferring the granular activated carbon from the second zone to the first zone includes the step of replacing the first column with the second column and the step of replacing the second column with the third column.

4. The process of claim 1 which includes the steps of:

providing a third sorbent treatment zone for treating the liquid before the liquid is treated in the first sorbent treatment zone;

transferring the granular activated carbon from the first sorbent treatment zone to the third sorbent treatment zone after using the granular activated carbon in the first sorbent treatment zone.

5. A system for treating a liquid containing impurities which inhibit the biological treatment of the liquid, said system comprising:

a. a first and a second sorbent treatment zone for treating the liquid with granular activated carbon in which said first sorbent treatment zone includes a first column containing a bed of granular solid activated carbon, said second sorbent treatment zone including a second column containing a bed of granular solid activated carbon;

b. a biological treatment system for biologically treating the liquid;

c. means for transferring the liquid between said first and second zones and said biological system to provide for treatment of the liquid in said second zone after treatment in said first zone and which transferring means transfers the liquid through said first column in an upwardly direction and transfers the liquid through said second column in a downwardly direction;

d. means for removing the granular activated carbon from said first zone;

e. means for reactivating the granular activated carbon removed from said first zone;

f. means for transferring the granular activated carbon in said second zone to said first zone after using the granular activated carbon in said second zone; and g. means for detecting a breakthrough in one of the zones which activates said means for transferring the granular activated carbon from said second zone to said first zone.

6. A system as described in claim 5 which includes means for adding fresh granular activated carbon to said second sorbent treatment zone.

7. A system as described in claim 5 which includes a third sorbent treatment zone having fresh granular activated carbon therein and wherein said means for transferring the granular activated carbon from said second zone to said first zone includes a manifold system which replaces said first zone with said second zone and said second zone with said third zone upon breakthrough of the granular activated carbon in one of said first and second sorbent treatment zones.

* * * * *

UNITED STATES PATENT AND TRADEMARK OFFICE
CERTIFICATE OF CORRECTION

PATENT NO. : 4,237,002

DATED : December 2, 1980

INVENTOR(S) : George E. Strudgeon and Aloysius X. Hiltgen

It is certified that error appears in the above-identified patent and that said Letters Patent are hereby corrected as shown below:

Column 1, line 39 change the word "liquids" to --liquid--.

Column 1, line 39 change the word "The" to --This--.

Column 10, line 55 change the numeral "68c" to --66c--.

Signed and Sealed this

Tenth Day of March 1981

[SEAL]

Attest:

RENE D. TEGTMEYER

*Attesting Officer*     *Acting Commissioner of Patents and Trademarks*